United States Patent
Anson

(10) Patent No.: US 9,703,659 B2
(45) Date of Patent: Jul. 11, 2017

(54) CUSTOMER SUPPORT USING VIRTUAL MACHINES

(75) Inventor: Douglas M. Anson, Dripping Springs, TX (US)

(73) Assignee: Dell Products L.P., Round Rock, TX (US)

( * ) Notice: Subject to any disclaimer, the term of this patent is extended or adjusted under 35 U.S.C. 154(b) by 2369 days.

(21) Appl. No.: 11/953,431

(22) Filed: Dec. 10, 2007

(65) Prior Publication Data

US 2009/0150291 A1 Jun. 11, 2009

(51) Int. Cl.
*G06F 11/26* (2006.01)
*G06Q 30/02* (2012.01)
*H04L 29/08* (2006.01)

(52) U.S. Cl.
CPC ....... *G06F 11/261* (2013.01); *G06Q 30/0281* (2013.01); *H04L 67/08* (2013.01)

(58) Field of Classification Search
USPC ..................................................... 714/28, 29
See application file for complete search history.

(56) References Cited

U.S. PATENT DOCUMENTS

| | | | |
|---|---|---|---|
| 6,397,242 B1 | 5/2002 | Devine et al. | |
| 6,477,531 B1 | 11/2002 | Sullivan et al. | |
| 6,987,838 B2 | 1/2006 | Winterbottom | |
| 7,356,679 B1* | 4/2008 | Le et al. | 713/1 |
| 7,644,312 B2* | 1/2010 | Hind et al. | 714/38.14 |
| 2002/0112171 A1* | 8/2002 | Ginter et al. | 713/185 |
| 2005/0216912 A1* | 9/2005 | Cox et al. | 717/178 |
| 2006/0010176 A1* | 1/2006 | Armington | 707/204 |
| 2006/0155708 A1* | 7/2006 | Brown et al. | 707/10 |

\* cited by examiner

*Primary Examiner* — Tsan-Yu J Huang
(74) *Attorney, Agent, or Firm* — Haynes and Boone, LLP

(57) ABSTRACT

A customer support system includes at least one subsystem to communicate with a customer about a problem with a customer information handling system (IHS), wherein the customer IHS includes a plurality of first customer IHS data. The plurality of first customer IHS data is received from the customer and used to create a virtual IHS having substantially the same characteristics as the customer IHS. A problem with the customer IHS is then diagnosed using the virtual IHS.

17 Claims, 2 Drawing Sheets

CUSTOMER SUPPORT USING VIRTUAL MACHINES

BACKGROUND

The present disclosure relates generally to information handling systems, and more particularly to customer support for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHS customers will typically need customer support for their IHSs sometime during the life of the IHS. Customer support for the IHS may address many different issues such as, for example, hardware issues, software issues, and/or usability issues. The provision of such customer support raises a number of issues.

Conventionally, the customer contacts a customer support provider over the phone or electronically (e.g. using an instant messaging or email system) to relay the problem and receive a solution. Such methods are time consuming and present difficulties in the determination, diagnosis, and resolution of the problem. Some customer support providers attempt to solve this problem by allowing the customer to send operating system backups to the customer support provider, but this may require a full operating system re-installation which further increases the time required for the customer support provider to deal with the problem.

Accordingly, it would be desirable to provide improved customer support.

SUMMARY

According to one embodiment, a customer support system includes at least one subsystem to communicate with a customer about a problem with a customer IHS, wherein the customer IHS includes a plurality of first customer IHS data, to receive the plurality of first customer IHS data from the customer, to use the plurality of first customer IHS data to create a virtual IHS having substantially the same characteristics as the customer IHS, and to diagnose the problem with the customer IHS using the virtual IHS.

BRIEF DESCRIPTION OF THE DRAWINGS

FIG. 2b is a schematic view illustrating an embodiment of a customer support provider used in the customer support system of FIG. 2a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
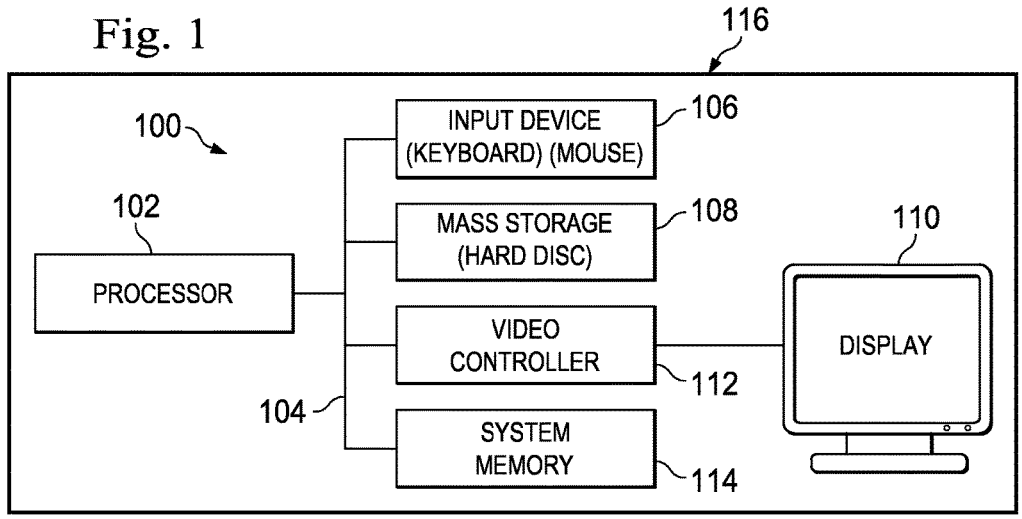
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

The IHS includes a computer-readable medium that may include, for example, the mass storage 108, the system memory 114, removable media (e.g. optical disks, flash memory, etc.), and/or a variety of other computer-readable mediums known in the art. The computer-readable medium stores functional descriptive material such as, for example, software, computer programs, applications, and/or other data structures known in the art. Such functional descriptive material imparts functionality when encoded on the computer-readable medium. Within such functional descriptive material, computer programs define structural and functional interrelationships between such computer programs and the computer-readable medium. Such interrelationships permit the computer programs' functionality to be realized. For example, the processor 102 reads such functional descriptive material from the computer-readable medium onto the system memory 114 of the IHS 100, and the processor 102 performs its operations, in response to such material which is stored in the system memory 114 of the IHS 100. Further, the computer-readable medium is an apparatus from which the computer application is accessible by the processor 102, and the computer application is processable by the processor 102 for causing the processor 102 to perform such additional operations. In addition to reading such functional descriptive material from the computer-readable medium, the processor 102 is capable of reading such functional descriptive material from or through the network 102, which is also a computer-readable medium.

Figure 2A:
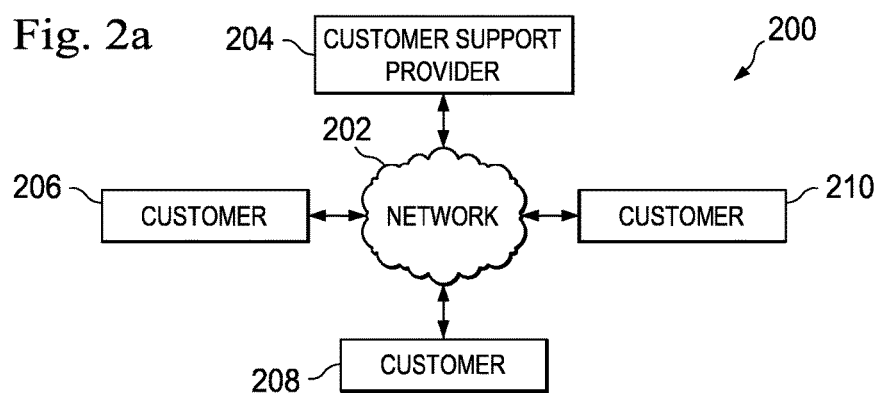
FIG. 2a is a schematic view illustrating an embodiment of a customer support system.

Referring now to FIG. 2a, an customer support system 200 is illustrated. The customer support system 200 includes a network 202 such as, for example, a Transport Control Protocol/Internet Protocol (TCP/IP) network (e.g., the Internet or an intranet). An customer support provider 204 is operably coupled to the network 202. A plurality of customers 206, 208 and 210 are also operably coupled to the network 202 in order to allow communication between the customers 206, 208 and 210 and the customer support provider 204. In the discussion below, the customer 206 is a representative one of the customers 206, 208 and 210. In an embodiment, the customer support provider 204 may be, for example, a manufacturer of IHSs, a seller of IHSs, a repairer of IHSs, combinations thereof, and/or a variety of other IHS customer support providers known in the art.

Each of the customers 206, 208 and 210 and the customer support provider 204 includes a respective network interface for communicating with the network 202 (e.g., outputting information to, and receiving information from, the network 202), such as by transferring information between such customers and the network 202. Accordingly, through the network 202, the customer support provider 204 communicates with the customers 206, 208 and 210 and the customers 206, 208 and 210 communicate with the customer support provider 204. The customer support provider 204 and the customers 206, 208 and 210 may each include a respective IHS such as, for example, the IHS 100 described above with reference to FIG. 1. Moreover, as illustrated in FIG. 2a, all such IHSs may be coupled to each other through the network 202.

Figure 2B:
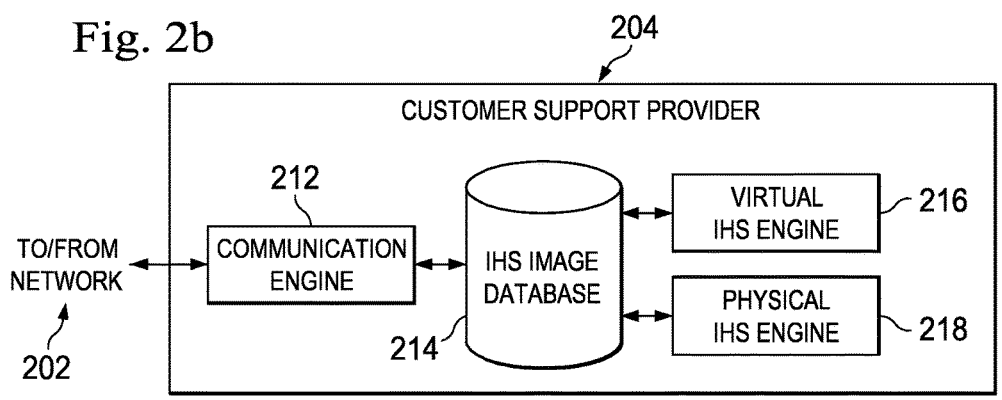

Referring now to FIG. 2b, the customer support provider 204 is illustrated in more detail. The customer support provider 204 includes a communication engine 212 that is operatively coupled to the network 202 and to a IHS image database 214. The IHS image database is operatively coupled to a virtual IHS engine 216 and to a physical IHS engine 218. In an embodiment, the communication engine 212 may be software located on an IHS of the customer support provider 204 and is operable to facilitate communication between the customer support provider 204 and the customers 206, 208 and/or 210 using methods known in the art. In an embodiment, the virtual IHS engine 216 may be software located on an IHS of the IHS provider 204 and is operable to create a virtual machine as described in further detail below. In an embodiment, the physical IHS engine 218 may be software located on an IHS of the IHS provider 204 and is operable to create a physical machine as described in further detail below. In an embodiment, the IHS image database 214 is a conventional database known in the art. While the IHS image database 214 is illustrated as being located within the customer support provider 204, the IHS image database 214 may be located outside the customer support provider 204 and coupled to the customer support provider 204 through, for example, the network 202. While the IHS image database 214 is illustrated as being a single database, it may include a plurality of databases. In an embodiment, the communication engine 212, the virtual IHS engine 216, and the physical IHS engine 218 may all be located on a computer-readable medium on one or more IHSs of the customer support provider 204.

Figure 3:
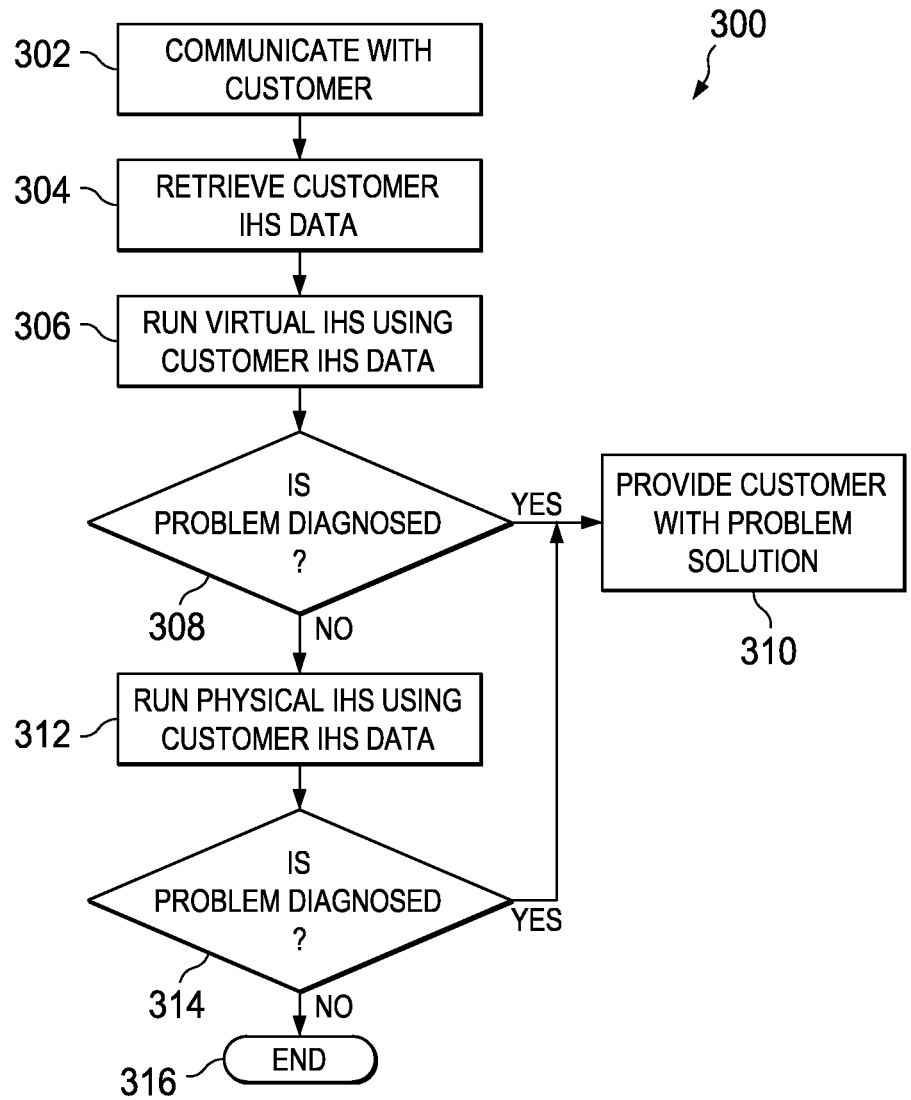
FIG. 3 is a flow chart illustrating an embodiment of a customer support method.

Referring now to FIG. 3, a method 300 for customer support is illustrated. The method 300 begins at block 302 where the customer support provider 204 communicates with the customer 206. In an embodiment, the customer 206 is a user of a customer IHS which may be, for example, the IHS 100 described above with reference to FIG. 1, and the customer 206 experiences a problem with the customer IHS. In an embodiment, the problem with the customer IHS may relate to, for example, a software issue, a hardware issue, an operating system issue, a platform issue, and/or a variety of other IHS problems known in the art. In an embodiment, the problem with the customer IHS includes a software or hardware issue pertaining to the operating system or platform of the customer IHS. The communication engine 212 may provide a variety of different communication mediums for the customer 206 and the customer support provider 204 to use to communicate such as, for example, an internet website, a telephone communication, electronic communication (e.g., email, instant messaging, etc.), fax communication, face-to-face communication, and/or a variety of other communication mediums known in the art. In an embodiment, the customer 206 communicates the problem with the customer IHS to the provider 204 and the provider 204 determines that the problem with the customer IHS is such that the problem cannot be solved by a simple communication back to the customer 206.

The method 300 then proceeds to block 304 where the customer support provider 204 retrieves customer IHS data from the customer IHS. In an embodiment, the customer IHS includes a runtime environment that may include, for example, an operating system and a plurality of hardware dependencies that correspond to that runtime environment and allow that runtime environment to perform as it does on the customer IHS. In an embodiment, the operating system for the customer IHS includes a plurality of files such as, for example, configuration files, user data files, and a variety of other files known in the art that allow the operating system to perform as it does on the customer IHS. The customer support provider 204 may provide the customer 206 with a physical-to-logical image creation engine that may include, for example, software that may be loaded on the customer IHS and operable to collect the runtime environment of the customer IHS as customer IHS data, or an 'image' of the customer IHS, that may be run as a virtual machine, described in further detail below. In an embodiment, an 'image' of the customer IHS may include changes to the operating system run on the customer IHS that allows the operating system to run on a virtual IHS, described in further detail below. In an embodiment, the physical-to-logical image creation engine can be provided to the customer 206 through a hard copy (e.g. on an optical disk), an electronic file sent to the customer 206 through, for example, an electronic message, a link to a location where the physical-to-logical image creation engine is located, and/or using a variety of other provision methods known in the art. The customer 206 can then run the physical-to-logical image creation engine on the customer IHS, and the physical-to-logical image creation engine will collect the runtime environment of the customer IHS as customer IHS data that includes information relating to, for example, the operating system and the hardware dependencies within the operating system for the customer IHS. The physical-to-logical image creation engine or the customer 206 can then send that customer IHS data to the provider 204 through the communication engine 212 such that the customer IHS data is stored in the IHS image database 214. In an embodiment, the physical-to-logical image creation engine encrypts the customer IHS data in order to limit the customer IHS data from being viewed in transit from the customer IHS to the IHS image database 214. In an embodiment, the physical-to-logical image creation engine removes private customer data of the customer 206 from the customer IHS data such as, for example, digital photos, personal information, passwords, browser information, and a variety of other private files known in the art, before sending the customer IHS data to the provider 204.

The method 300 then proceeds to block 306 where a virtual IHS is run using the customer IHS data. In an embodiment, the customer support provider 204 can include a support IHS that may be, for example, the IHS 100, described above with reference to FIG. 1. The virtual IHS engine 216 retrieves the customer IHS data, or 'image' from the customer IHS, from the IHS image database 214 and creates a virtual IHS using the support IHS. In an embodiment, the virtual IHS engine 216 can decrypt the customer IHS data that was encrypted at block 304 of the method 300. The virtual IHS engine 216 can use the customer IHS data to create a virtual IHS that is identical or includes substantially the same characteristics as the customer IHS. In an embodiment, the substantially same characteristics of the virtual IHS include virtual hardware that is substantially similar to the hardware used on the customer IHS such that the virtual IHS can produce a runtime environment that is the same as the runtime environment of the customer IHS. In an embodiment, the runtime environment produced by the virtual IHS includes an operating system that is produced on the virtual IHS the same as the operating system is produced on the customer IHS. In an embodiment, the virtual hardware does not need to be identical to the hardware of the customer IHS. Rather, the virtual hardware needs only to be able to produce the operating system of the customer IHS the same as it is produced by the customer IHS. For example, if the problem with the customer IHS is a graphics problem, the capacity of a virtual hard drive on the virtual IHS relative to the capacity of a hard drive on the customer IHS may vary, as hard drive capacity may not be a variable that would contribute to a graphics problem. In an embodiment, the creation of the virtual IHS from the customer IHS data is such that it does not produce an additional variable for problem diagnosis relative to the variables present in the customer IHS.

Referring now to FIG. 3, the method 300 proceeds to decision block 308 where it is determined whether the problem with the customer IHS has been diagnosed. With the virtual IHS created in block 306 of the method 300, in an embodiment, the customer support provider 204 or a representative of the customer support provider 204 can use the virtual IHS to triage and/or diagnose the problem with the customer IHS. In an embodiment, the virtual IHS engine 216 can be operable to diagnose the problem with the customer IHS using the virtual IHS. If the problem with the customer IHS is diagnosed using the virtual IHS, the method 300 proceeds to block 310 where the customer 206 is provided with the solution to the problem with the customer IHS. Use of the virtual IHS to diagnose the problem with the customer IHS allows the customer support provider 204 or the virtual IHS engine 216 to determine the solution to the problem and produce, for example, a list of steps that the customer 206 must perform to fix the problem with the customer IHS that can be then provided to the customer 206. In an embodiment, the diagnosis can determine that the problem with the customer IHS requires replacement hardware for the customer IHS, and the customer support provider 204 can then inform the customer 206 that the replacement hardware is being provided. While examples have been provided, the solution to any problem that can be solved using the virtual IHS can be provided to the customer 206 at block 310 of the method 300.

Referring now to FIG. 3, if at decision block 308 it is determined that the problem with the customer IHS has not been diagnosed, the method 300 proceeds to block 312 where a physical IHS is run using the customer IHS data. In an embodiment, the customer support provider 204 can include a support IHS that may be, for example, the IHS 100, described above with reference to FIG. 1. If the virtual IHS created in block 306 of the method 300 does not allow diagnosis of the problem with the customer IHS, the customer support provider 204 or a representative of the customer support provider 204 has the option to use the physical IHS engine 218 to retrieve the customer IHS data, or 'image' from the customer IHS, from the IHS image database 214 and create a physical IHS using the support IHS. In an embodiment, the physical IHS engine 218 can decrypt the customer IHS data that was encrypted at block 304 of the method 300. The support IHS is configured to include physical hardware that is identical or exhibits substantially the same characteristics as the customer IHS. In an embodiment, the substantially same characteristics of the physical hardware are such that the support IHS becomes a physical IHS that can produce a runtime environment that is the same as the runtime environment of the customer IHS. In an embodiment, the runtime environment produced by the physical IHS includes an operating system that is produced on the physical IHS the same as the operating system is produced on the customer IHS. In an embodiment, the physical hardware does not need to be identical to the hardware of the customer IHS. Rather, the physical hardware needs only to be able to produce the operating system of the customer IHS the same as it is produced by the customer IHS. For example, if the problem with the customer IHS is a graphics problem, the capacity of a physical hard drive in the physical IHS relative to the capacity of a hard drive on the customer IHS may vary, as hard drive capacity may not be a variable that would contribute to a graphics problem. The physical IHS engine 218 can use a logical-to-physical image engine to use the customer IHS data, or 'image' from the customer IHS, from the IHS image database 214 to recreate the runtime environment of the customer IHS on the physical IHS. In an embodiment, the physical IHS includes an IHS with an identical operating system and hardware as the customer IHS.

Referring now to FIG. 3, the method 300 proceeds to decision block 314 where it is determined whether the problem with the customer IHS has been diagnosed. With the physical IHS created in block 312 of the method 300, in an embodiment, the customer support provider 204 or a representative of the customer support provider 204 can use the physical IHS to triage and/or diagnose the problem with the customer IHS. In an embodiment, the physical IHS engine 218 can diagnose the problem with the customer IHS using the physical IHS. If the problem with the customer IHS is diagnosed using the physical IHS, the method 300 proceeds to block 310 where the customer 206 is provided with the solution to the problem with the customer IHS. Use of the physical IHS to diagnose the problem with the customer IHS allows the customer support provider 204 or the physical IHS engine 218 to determine the solution to the problem and produce, for example, a list of steps that the customer 206 must perform to fix the problem with the customer IHS that can be then provided to the customer 206. In an embodiment, the diagnosis can determine that the problem with the customer IHS requires replacement hardware for the customer IHS, and the customer support provider 204 can then inform the customer 206 that the replacement hardware is being provided. While examples have been provided, the solution to any problem that can be solved using the physical IHS can be provided to the customer 206 at block 310 of the method 300.

Referring now to FIG. 3, if at decision block 314 it is determined that the problem with the customer IHS has not been diagnosed, the method 300 proceeds to block 316 where the method ends and the customer support provider 204 recommends alternate customer supports options to solve the problem with the customer IHS. Thus, a system and method are provided which allow a customer support provider to accurately diagnose a problem on a customers IHS by recreating the customers IHS to allow triage and/or diagnosis of the problem.

In an embodiment, after the conclusion of the method 300, the customer 206 may experience another problem with the customer IHS. The method 300 can then be repeated substantially similarly as is described above. However, second customer IHS data from the customer IHS that is retrieved at block 304 in the second iteration of the method 300 can then be compared to first customer IHS data from the customer IHS that was retrieved at block 304 in the first iteration of the method 300. In an embodiment, the virtual IHS engine 216 and/or the physical IHS engine 218 can compare the first customer IHS data and the second customer IHS data to determine whether or not a change has been made to the customer IHS between the first iteration of the method 300 and the second iteration of the method 300. In an embodiment, the comparing of the first customer IHS data and the second customer IHS data may occur before, during, or after the creation and/or running of the virtual IHS or the physical IHS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A customer support system, comprising:
a customer physical information handling system (IHS) including a customer IHS runtime environment; and
a first support physical information handling system (IHS) including a support IHS processor and a support IHS computer-readable medium coupled to the support IHS processor, wherein the first support physical IHS is coupled to the customer physical IHS through a network, and wherein the support IHS computer-readable medium includes instructions that, when executed by the support IHS processor, cause the support IHS processor to perform the steps of:
communicating with the customer physical IHS over the network about a problem with the customer physical IHS;
receiving, over the network from the customer physical IHS, a plurality of first customer IHS data that corresponds to the customer IHS runtime environment;
creating, on the first support physical IHS using the plurality of first customer IHS data, a virtual IHS having an operating system and virtual hardware that provide a virtual IHS runtime environment that is the same as the customer IHS runtime environment;
determining that the problem with the customer physical IHS was not diagnosed using the virtual IHS;
providing the plurality of first customer IHS data on a second support physical IHS that is configured to include physical hardware that utilizes the plurality of first customer IHS data to produce a second support physical IHS runtime environment that is the same as the customer IHS runtime environment and that reproduces the problem with the customer physical IHS; and
diagnosing the problem with the customer physical IHS using the second support physical IHS.

2. The system of claim 1, wherein the plurality of first customer IHS data includes the operating system and a plurality of customer physical IHS hardware dependencies corresponding to the customer IHS runtime environment.

3. The system of claim 1, wherein the virtual IHS comprises the virtual hardware that corresponds to physical hardware on the customer physical IHS that is needed to produce the virtual IHS runtime environment that is the same as the customer IHS runtime environment.

4. The system of claim 1, wherein the support IHS computer-readable medium includes instructions that, when executed by the support IHS processor, cause the support IHS processor to perform the steps of:
removing private customer data from the plurality of first customer IHS data.

5. The system of claim 1, wherein the
physical hardware on the second support physical IHS is the same as the physical hardware on the customer physical IHS.

6. The system of claim 5, wherein the physical hardware on the second support physical IHS is substantially the same as the physical hardware on the customer physical IHS.

7. The system of claim 1, wherein the support IHS computer-readable medium includes instructions that, when executed by the support IHS processor, cause the support IHS processor to perform the steps of:
receiving a plurality of second customer IHS data from the customer physical IHS;
comparing the plurality of first customer IHS data to the plurality of second customer IHS data; and
determining that a change has been made to the customer physical IHS.

8. The system of claim 1, wherein the support IHS computer-readable medium includes instructions that, when executed by the support IHS processor, cause the support IHS processor to perform the steps of:
providing the customer physical IHS with a physical-to-logical image creation engine that is configured to collect the customer IHS runtime environment on the customer physical IHS as the plurality of first customer IHS data.

9. The system of claim 8, wherein the physical-to-logical image creation engine is configured to encrypt the plurality of first customer IHS data.

10. A first support physical information handling system (IHS) that includes a support IHS processor and a support IHS computer-readable medium coupled to the support IHS processor, wherein the support IHS computer-readable medium includes instructions that, when executed by the support IHS processor, cause the support IHS processor to perform the steps of:

receiving, from a customer physical IHS over a network, a plurality of first customer IHS data that corresponds to a customer IHS runtime environment on the customer physical IHS;

creating, on the first support physical IHS using the plurality of first customer IHS data, a virtual IHS having an operating system and a plurality of virtual hardware that provide a virtual IHS runtime environment that is the same as the customer IHS runtime environment;

determining that a problem with the customer physical IHS was not diagnosed using the virtual IHS;

providing the plurality of first customer IHS data on a second support physical IHS that is configured to include physical hardware that utilizes the plurality of first customer IHS data to produce a second support physical IHS runtime environment that is the same as the customer IHS runtime environment and that reproduces the problem with the customer physical IHS; and diagnosing the problem with the customer physical IHS using the second support physical IHS.

11. The system of claim 9, wherein the plurality of first customer IHS data includes the operating system and a plurality of customer physical IHS hardware dependencies corresponding to the customer IHS runtime environment.

12. The system of claim 9, wherein the virtual IHS comprises the plurality of virtual hardware that corresponds to a plurality of physical hardware on the customer physical IHS that is needed to produce the virtual IHS runtime environment in the same as the customer IHS runtime environment.

13. The system of claim 9, wherein the support IHS computer-readable medium includes instructions that, when executed by the support IHS processor, cause the support IHS processor to perform the steps of:

providing a user of the customer physical IHS with a physical-to-logical image creation engine that is configured to collect the customer IHS runtime environment on the customer physical IHS as the plurality of first customer IHS data.

14. The system of claim 9, wherein the physical hardware on the second support physical IHS is substantially the same as the physical hardware on the customer physical IHS.

15. The system of claim 9, wherein the support IHS computer-readable medium includes instructions that, when executed by the support IHS processor, cause the support IHS processor to perform the steps of:

receiving a plurality of second customer IHS data form the customer physical IHS;

comparing the plurality of first customer IHS data to the plurality of second customer IHS data; and determining that a change has been made to the customer physical IHS.

16. The system of claim 9, wherein the support IHS computer-readable medium includes instructions that, when executed by the support IHS processor, cause the support IHS processor to perform the steps of:

removing private customer data from the first customer IHS data.

17. The system of claim 9, wherein the support IHS computer-readable medium includes instructions that, when executed by the support IHS processor, cause the support IHS processor to perform the steps of:

decrypting the plurality of first customer IHS data.

\* \* \* \* \*